(12) United States Patent
Alam et al.

(10) Patent No.: US 10,956,298 B2
(45) Date of Patent: Mar. 23, 2021

(54) METHODS AND APPARATUS TO DETECT MEMORY LEAKS IN COMPUTING SYSTEMS

(71) Applicant: Intel Corporation, Santa Clara, CA (US)

(72) Inventors: Mohammad Mejbah Ul Alam, Milpitas, CA (US); Jason Martin, Beaverton, OR (US); Justin Gottschlich, Santa Clara, CA (US); Alexander Heinecke, San Jose, CA (US); Shengtian Zhou, Palo Alto, CA (US)

(73) Assignee: INTEL CORPORATION, Santa Clara, CA (US)

( * ) Notice: Subject to any disclaimer, the term of this patent is extended or adjusted under 35 U.S.C. 154(b) by 86 days.

(21) Appl. No.: 16/234,503

(22) Filed: Dec. 27, 2018

(65) Prior Publication Data

US 2019/0129822 A1    May 2, 2019

(51) Int. Cl.
| | | |
|---|---|---|
| *G06F 11/00* | (2006.01) | |
| *G06F 11/34* | (2006.01) | |
| *G06N 3/08* | (2006.01) | |
| *G06F 11/32* | (2006.01) | |
| *G06F 11/30* | (2006.01) | |
| *G06F 11/07* | (2006.01) | |

(52) U.S. Cl.
CPC ........ *G06F 11/3495* (2013.01); *G06F 11/073* (2013.01); *G06F 11/0751* (2013.01); *G06F 11/3037* (2013.01); *G06F 11/327* (2013.01); *G06F 11/3409* (2013.01); *G06F 11/3466* (2013.01); *G06N 3/088* (2013.01)

(58) Field of Classification Search
CPC ............... G06F 11/0751; G06F 11/073; G06F 11/3466; G06F 11/327
See application file for complete search history.

(56) References Cited

U.S. PATENT DOCUMENTS

| | | | | |
|---|---|---|---|---|
| 2014/0237599 A1* | 8/2014 | Gertner | ............... | H04L 63/1441 726/24 |
| 2014/0372807 A1* | 12/2014 | Poola | .................. | G06F 11/3414 714/39 |

OTHER PUBLICATIONS

Chilimbi et al., "Low-overhead memory leak detection using adaptive statistical profiling," ASPLOS, Oct. 2004, 9 pages.
Clause et al., "Leakpoint: pinpointing the causes of memory leaks," In Proc. of the 32nd ICSE, New York, NY, USA, May 2-8, 2010, 10 pages.

(Continued)

*Primary Examiner* — Charles Ehne
(74) *Attorney, Agent, or Firm* — Hanley, Flight & Zimmerman, LLC

(57) ABSTRACT

Methods, apparatus, systems and articles of manufacture are disclosed. An example system includes a memory accessed by a program of interest, a performance monitoring unit to collect first memory access information and second memory access information about an object accessed in the memory by the program of interest; and a leak detector to: determine a non-access period based on the first memory access information and an unsupervised machine learning model trained based on the program of interest; and detect a potential memory leak of the program of interest based on the second memory access information and the non-access period.

25 Claims, 6 Drawing Sheets

(56) References Cited

OTHER PUBLICATIONS

Novark et al., "Efficiently and precisely locating memory leaks and bloat," In Proc. of the 30th PLDI, Jun. 15-20, 2009, 11 pages.

Nethercote et al., Valgrind: a framework for heavyweight dynamic binary instrumentation. In Proceedings of the ACM SIGPLAN 2007 Conference on Programming Language Design and Implementation (PLDI '07), pp. 89-100, Jun. 2007, 12 pages.

Hastings et al., "Fast detection of memory leaks and access errors," In Proceedings of the Winter '92 USENIX conference, pp. 125-136. USENIX Association, 1992, 12 pages.

Bond et al., "Bell: bit-encoding online memory leak detection," In Proceedings of the 12th International Conference on Architectural Support for Programming Languages and Operating Systems (ASPLOS '06), pp. 61-72, San Jose, CA, Oct. 2006, 12 pages.

Jung et al. "Automated memory leak detection for production use," In International Conference on Software Engineering (ICSE), 2014, 12 pages.

Lee et al., "Detecting memory leaks through introspective dynamic behavior modelling using machine learning," In Proceedings of the 36th International Conference on Software Engineering, 2014, 11 pages.

Intel Corporation, "Intel Microarchitecture Codename Nehalem Performance Monitoring Unit Programming Guide," 2010, 59 pages.

Drongowski et al., "Instruction-based sampling: A new performance analysis technique for amd family 10h processors," 2007, 14 pages.

Luk et al., "Pin: Building Customized Program Analysis Tools with Dynamic Instrumentation," In Proceedings of the SIGPLAN 2005 Conference on Programming Language Design and Implementation, Jun. 2005, 11 pages.

Mars et al., "Bubble-up: Increasing utilization in modern warehouse scale computers via sensible co-locations," In MICRO '11: Proceedings of The 44th Annual IEEE/ACM International Symposium on Microarchitecture, New York, NY, USA, 2011. ACM, 12 pages.

Guru of the Week (GoW) #9: Memory Management—Part:1 http://www.gotw.ca/gotw/009.htm, 2009, 2 pages.

\* cited by examiner

METHODS AND APPARATUS TO DETECT MEMORY LEAKS IN COMPUTING SYSTEMS

FIELD OF THE DISCLOSURE

This disclosure relates generally to computing systems, and, more particularly, to detect memory leaks in computing systems.

BACKGROUND

A major source of bugs in production software is memory leaks. A memory leak happens when a program fails to deallocate (or free) objects that have been allocated in memory by that program. Such objects remain allocated and, therefore, consume heap memory. As a result, memory leaks may gradually exhaust available memory of a computing system, which could result in significant performance degradation or a crash of the computing system. Memory leaks can also be exploited to introduce security issues in a software (e.g., denial-of-service attack).

BRIEF DESCRIPTION OF THE DRAWINGS

In general, the same reference numbers will be used throughout the drawing(s) and accompanying written description to refer to the same or like parts.

DETAILED DESCRIPTION

Memory leaks have become more prevalent with the advent of multicore systems. Furthermore, it is generally difficult for programmers to determine an exact program point or thread for deallocating an object in a multithreaded program (e.g., a point at which the memory allocated to an object is no longer needed). Therefore, programmers often end up leaving an object allocated in the memory beyond the point at which the object is needed. Moreover, because memory leaks are often input and environment sensitive, memory leaks can escape the testing phase and can cause a devastating failure after deployment.

Reproducing memory leaks for debugging can be extremely difficult because memory leaks often manifest over long periods of time and in response to exceptional events. Therefore, memory leak detection is critical in production software. Unfortunately, existing tools that utilize binary instrumentation, garbage collection, or heavyweight heap object tracking are not suitable for production deployment because of their significant runtime and memory overhead.

Example methods and apparatus disclosed herein utilize machine learning for efficient detection of potential memory leaks in deployed software programs. Disclosed examples use unsupervised learning of memory access patterns for robust and automatic detection of potential memory leaks.

Memory staleness is an indicator of the amount of time elapsed between memory accesses. Disclosed examples train a machine learning model for a program based on memory staleness to determine an expected threshold for future memory staleness. Memory objects having a time since last access that meets the threshold (e.g., exceeds the threshold) are indicated as potential memory leaks. A heavyweight offline memory leak detector may then analyze only the detected potential memory leaks (i.e., the heavyweight offline memory leak detector may be prevented from analyzing the full program). Therefore, overhead of memory leak detection is reduced. Moreover, disclosed examples using unsupervised learning do not rely on hypothetical examples of memory leaks, thereby, reducing memory leak false alarms.

Figure 1:
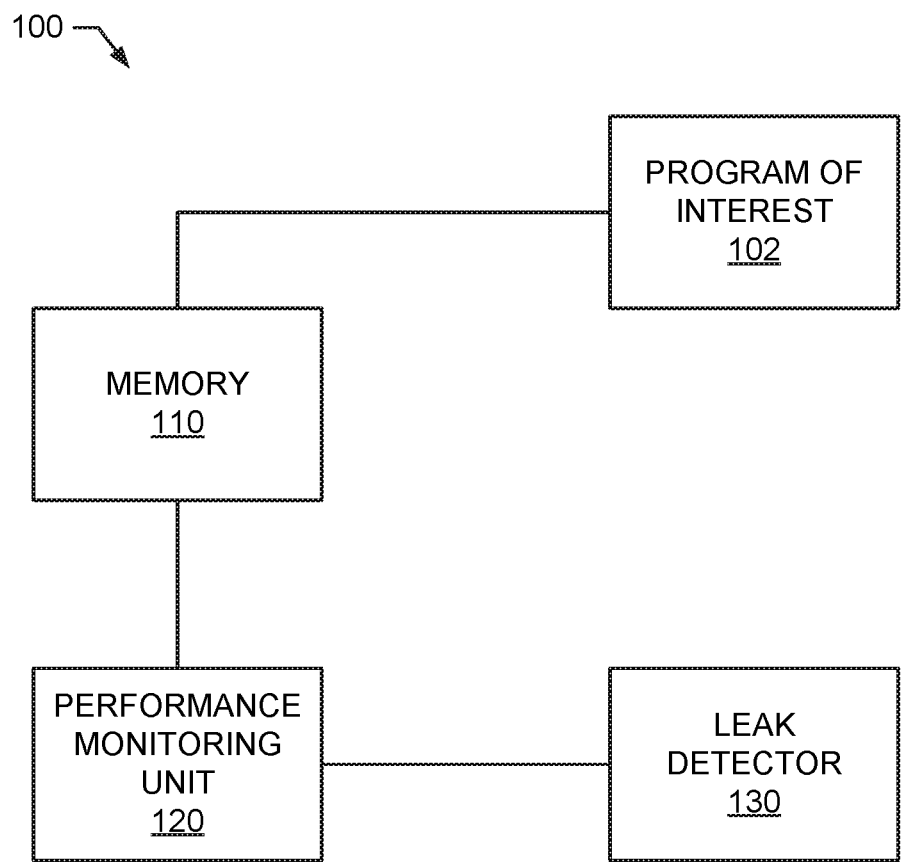
FIG. 1 is a block diagram of an example environment in which a program of interest is analyzed by a leak detector to detect a potential memory leak.

FIG. 1 is a block diagram of an example computing environment 100 in which an example program of interest 102 that accesses an example memory 110 is monitored by an example performance monitoring unit 120 and analyzed by an example leak detector 130 to detect potential memory leaks. The computing environment 100 may be implemented by the example processor system 600 of FIG. 6 or any other type of computing system(s).

The example program of interest 102 of FIG. 1 is application executing instructions within the example computing environment 100 (e.g., instructions executing on a processor of a computing system). For example, the program of interest 102 may be a program under development in which a developer wishes to analyze the program of interest 102 to detect memory leaks for repair prior to deployment of the program of interest 102. Alternatively, the program of interest 102 may be a program that is deployed to end users and monitored to detect memory leaks in the field. Alternatively, the program of interest 102 may be any other type of program at any stage of development or launch.

The example memory 110 is system memory of a computing system such as the computing system on which the program of interest 102 is executing. For example, the memory 110 may be heap memory, stack memory, etc. and may be stored in random access memory, cache memory, buffer memory, non-volatile storage, mass storage, etc.

The example performance monitoring unit (PMU) 120 is a hardware component that measures performance of the computing environment 100. For example, the PMU 120 of the illustrated example is a hardware component of a processor (e.g., the processor 612 of FIG. 6). The PMU 120 may be a component of the processor on which the program of interest 102 is executing. The example PMU 120 gathers memory access profile information of a program. In particular, the PMU 120 utilizes event-based instruction sampling to identify instructions of the program of interest 102 that access the memory 110 and to identify the address accessed by the instructions of the program of interest 102. For example, the event-based instruction sampling may trigger an interrupt on a value overflow (e.g., sampling period) and, in response to the interrupt, queries the instruction that caused the overflow.

The example leak detector 130 analyzes memory access profile information from the example PMU 120 to predict that a memory leak has occurred. The leak detector 130 may be implemented by software executing on a processor (e.g., the same processor executing the program of interest 102 and/or a different processor). In particular, the example leak detector 130 maps memory accesses to corresponding heap objects in the memory 110 to construct heap activity pairs (e.g., an identity of an object and a duration between two consecutive accesses of an object). A heap object may be uniquely identified using an instruction address at the allocation site. A duration between two consecutive accesses of an object is referred to as a non-access period (NAP).

The example leak detector 130 trains an unsupervised machine learning model (e.g., a recurrent neural network (RNN)) based on the heap activity pairs. After training the model, the model may be applied to memory access profile information collected by the PMU 120 during execution of the example program of interest 102 to estimate a NAP threshold. The leak detector 130 predicts that a memory leak has occurred when a last access of an object in the memory 110 meets the NAP threshold.

When the example leak detector 130 detects a potential memory leak, the leak detector 130 triggers at least one of an alert or mitigation actions. The mitigation actions may include taking an action to resolve the memory leak (e.g., removing a leaked object from memory) or may include performing further analysis. For example, the leak detector 130 may trigger a heavyweight analysis (e.g., offline analysis of the memory operations). The resources needed to perform a heavyweight analysis may be reduced from prior methods by focusing the heavyweight analysis on the instruction(s) detected to be responsible for the memory leak.

Figure 2:
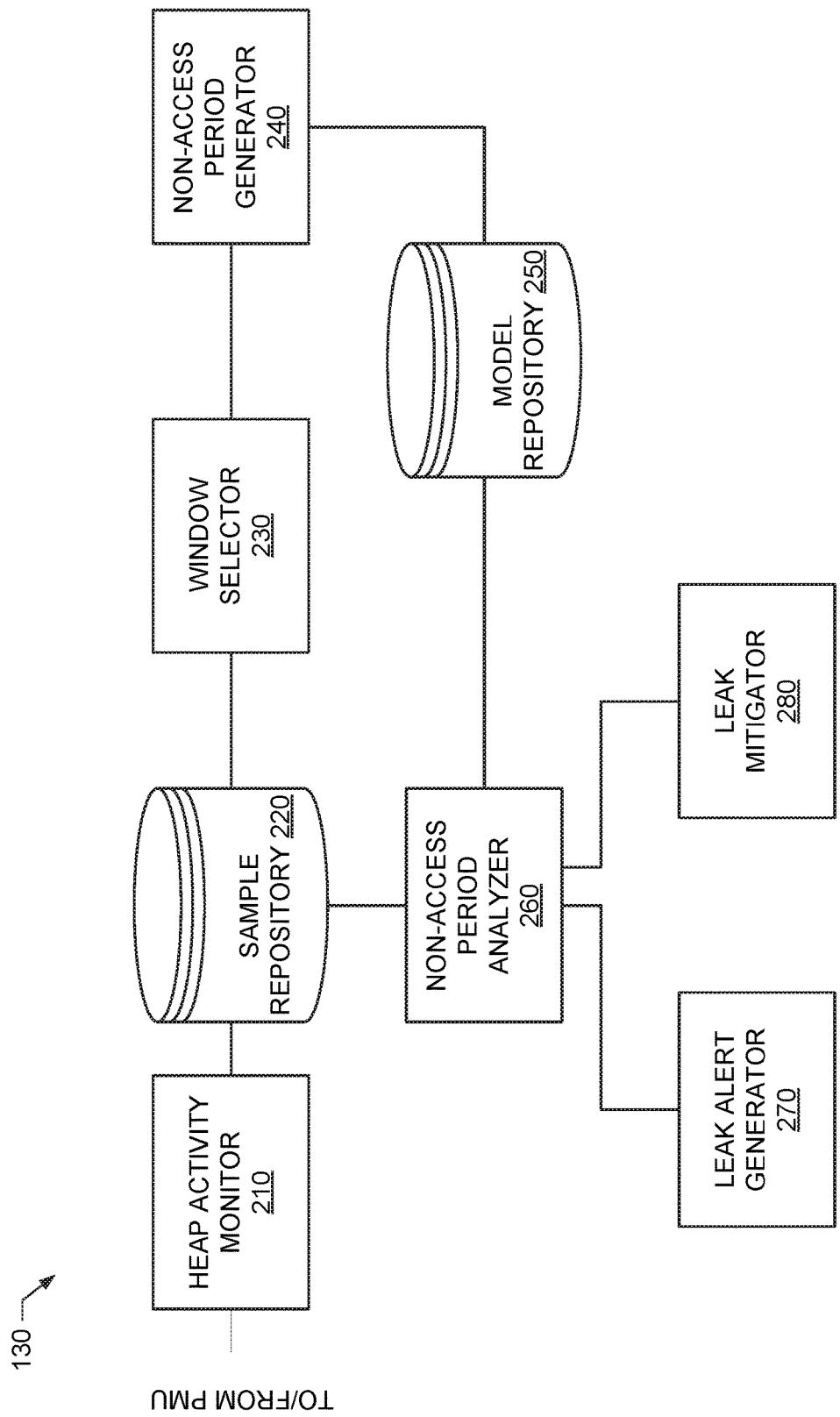
FIG. 2 is a block diagram of an example implementation of the leak detector of FIG. 1.

FIG. 2 is a block diagram of an example implementation of the leak detector 130 of FIG. 1. The example leak detector 130 of FIG. 2 includes an example heap activity monitor 210, an example sample repository 220, an example window selector 230, an example non-access period generator 240, an example model repository 250, an example non-access period analyzer 260, an example leak alert generator 270, and an example leak mitigator 280.

The example heap activity monitor 210 communicates with the example PMU 120 to collect memory access profile information. For example, the heap activity monitor 210 collects samples of memory access information and stores the samples in the example sample repository 220. The samples may be activity pairs, which include an indication of an object in the memory 110 and a NAP for the object. Alternatively, the samples may include an indication of an object, a first timestamp of a first access to the object, and a second timestamp of a second, consecutive access to the object. The identity of the object may be found using malloc_site(PC), where PC is the program counter, which is the memory address of the instruction that allocates memory for the object.

The example sample repository 220 is a database for storing memory access information. Alternatively, the sample repository 220 may be any type of data structure (e.g., a file, a buffer, a cache, a stack, a queue, etc.) stored in any type of storage such as a volatile memory, a non-volatile memory, a mass storage device, random access memory, etc.

The example window selector 230 selects a sliding window of samples corresponding to the program of interest 102 from the sample repository 220 during a training phase and/or during ongoing training. The example windows selector 230 sends the selected window of samples to the non-access period generator 240 for training a model to generator non-access period predictions. Alternatively, the window selector 230 may not be included in the leak detector 130 when all available samples are to be used during a training.

The example non-access period generator 240 trains an unsupervised machine learning model using the received samples for the program of interest 102. According to the illustrated example, the unsupervised machine learning model is an RNN model. Alternatively, any other type of unsupervised machine learning model may be utilized. The exampled trained model predicts NAP for a program based on context information (e.g., information about accesses to the memory 110 by the program of interest 102 during an analysis phase). The example RNN utilizes multiple trained layers of long-short term memory to generate a classifier that receives activity pairs and generates a predicted NAP.

The example model repository 250 is a database of program specific models generated by the example non-access period generator 240. Alternatively, the model repository 250 may be any type of data structure (e.g., a file, a buffer, a cache, a stack, a queue, etc.) stored in any type of storage such as a volatile memory, a non-volatile memory, a mass storage device, random access memory, etc.

According to the illustrated example, non-access period generator 240 is located on an end-user computing system at which the user executes the program of interest 102. Alternatively, the non-access period generator 240 may be located on a computing system utilized for generating models that are distributed to end-user computing systems. In such an example, a development system may include the heap activity monitor 210, the sample repository 220, the window selector 230, the non-access period generator 240, and the model repository 250. After models are trained by the developer, the models may be distributed from the model repository 250 at the developer site to a second instance of the model repository 250 located on the end-user computing system. In such an example, the end-user computing system may not include the window selector 230 and the non-access period generator 240.

The example non-access period analyzer 260 receives memory access information associated with execution of the program of interest 102 from the example sample repository 220 to determine if a memory object has not been accessed for a period that meets a predicted NAP threshold. When an object in the memory has not been accessed for a period that meets the predicted NAP threshold, the non-access period analyzer 260 determines that a potential memory leak has occurred. When the example non-access period analyzer 260 detects a potential memory leak, the non-access period analyzer 260 identifies the potential memory leak and the affected object to the example leak alert generator 270 and the example leak mitigator 280.

The example leak alert generator 270 is a user interface to indicate a potential memory leak to a user. For example, the leak alert generator 270 may display an indication of the potential memory leak and/or the identity of the object on a graphical user interface, may provide an audible alert, may illuminate an indicator (e.g., a light emitting diode), etc. The leak alert generator 270 may additionally transmit an indication of a potential memory leak (e.g., to a remote server, to a central server, to a developer of the program of interest 102, to a facility that includes the non-access period generator 240 for training models, to an email address, to a messaging server, etc.).

The example leak mitigator 280 performs mitigation of a memory leak in response to indication of a potential memory leak received from the example non-access period analyzer 260. According to the illustrated example, the leak mitigator 280 triggers a more rigorous and heavy-weight memory leak analysis (e.g., a study of alloc and malloc operations within code of the program of interest 102). Alternatively or additionally, any other mitigation may be performed. For example, the leak mitigator 280 may purge the object associated with the potential memory leak from the memory 110, may reboot/power cycle/reset the computing environment 100, may reset/restart the program of interest 102, may perform a garbage collection process on the memory 110, may recycle the memory 110, etc.

While the example leak detector 130 includes the leak alert generator 270 and the leak mitigator 280, some implementations may only include one of the leak generator 270 or the leak mitigator 280.

Figure 3:
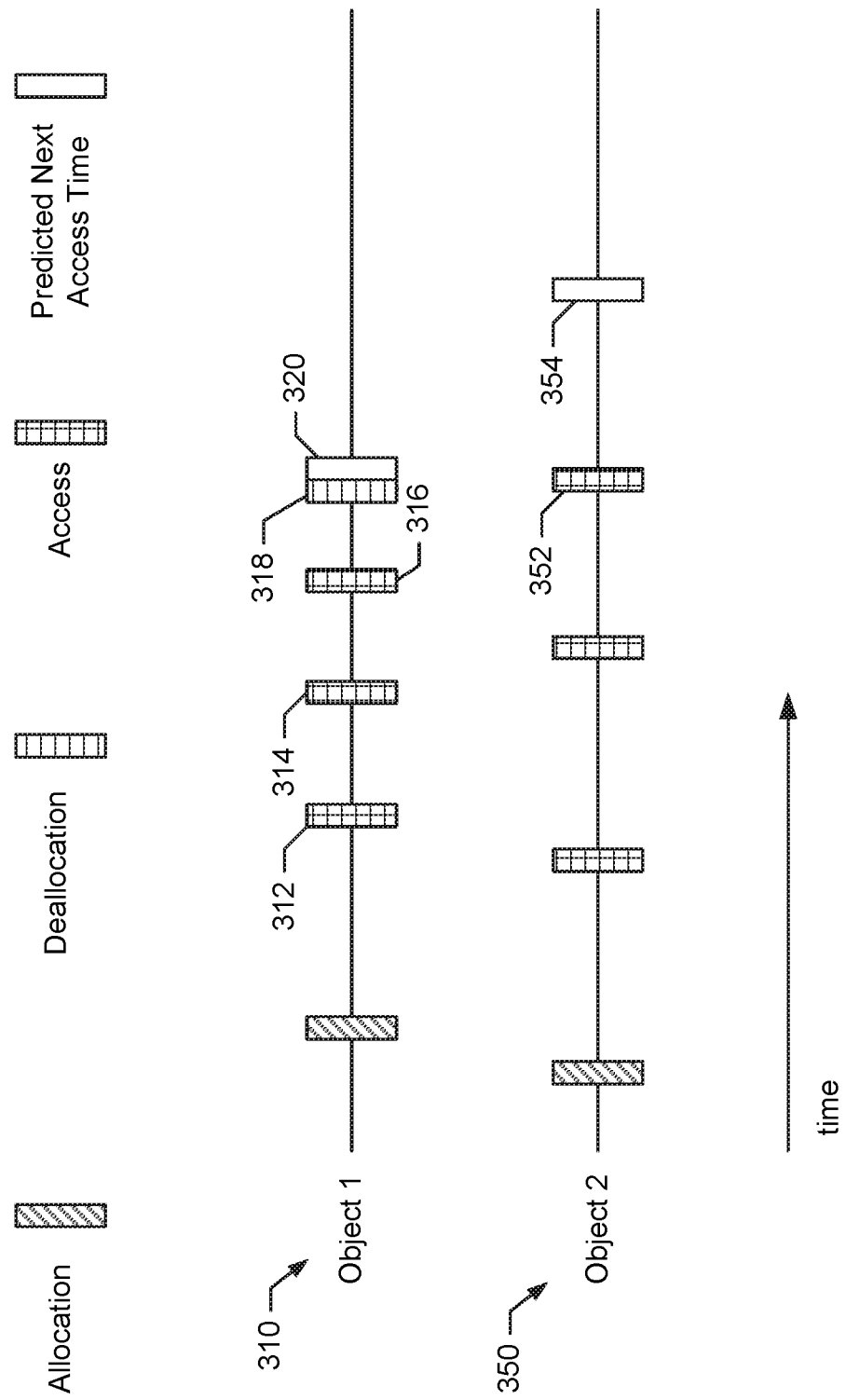
FIG. 3 illustrates example memory accesses to the example memory of FIG. 1.

FIG. 3 illustrates example memory accesses to the example memory 110. According to the illustrated example, an example first object 310 and an example second object 350 are stored in the memory 110.

After allocation, the first object 310 is accessed at a first time 312 and a second time 314, which illustrates an example NAP. The first object 310 is later accessed at a third time 316 and deallocated at a fourth time 318. According to the illustrated example, using a model generated by the non-access period generator 240 and prior memory access information, the non-access period analyzer 260 has determined a predicted NAP that leads to a first predicted time of next access 320 (e.g., predicted time of next access=time of last access (e.g., third time 316)+predicted NAP). In this example, because the first object 310 was accessed (e.g., deallocated) before the predicted time of next access 320, the leak detector 130 would not indicate a memory leak.

Turning to the example second object 350, after allocation, the second object 350 is accessed at a fourth time 352. According to the illustrated example, the second object 350 is not accessed after the fourth time 352 before a second predicted time of next access 354 (i.e., a predicted NAP has expired). Accordingly, the leak detector 130 would indicate a potential memory leak for the second object 350.

While an example manner of implementing the leak detector 130 of FIG. 1 is illustrated in FIG. 3, one or more of the elements, processes and/or devices illustrated in FIG. 3 may be combined, divided, re-arranged, omitted, eliminated and/or implemented in any other way. Further, the example heap activity monitor 210, the example window selector 230, the example non-access period generator 240, the example non-access period analyzer 260, the example leak alert generator 270, the example leak mitigator 280 and/or, more generally, the example leak detector 130 of FIG. 1 may be implemented by hardware, software, firmware and/or any combination of hardware, software and/or firmware. Thus, for example, any of the example heap activity monitor 210, the example window selector 230, the example non-access period generator 240, the example non-access period analyzer 260, the example leak alert generator 270, the example leak mitigator 280 and/or, more generally, the example leak detector 130 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example heap activity monitor 210, the example window selector 230, the example non-access period generator 240, the example non-access period analyzer 260, the example leak alert generator 270, the example leak mitigator 280 and/or, more generally, the example leak detector 130 of FIG. 1 is/are hereby expressly defined to include a non-transitory computer readable storage device or storage disk such as a memory, a digital versatile disk (DVD), a compact disk (CD), a Blu-ray disk, etc. including the software and/or firmware. Further still, the example leak detector 130 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
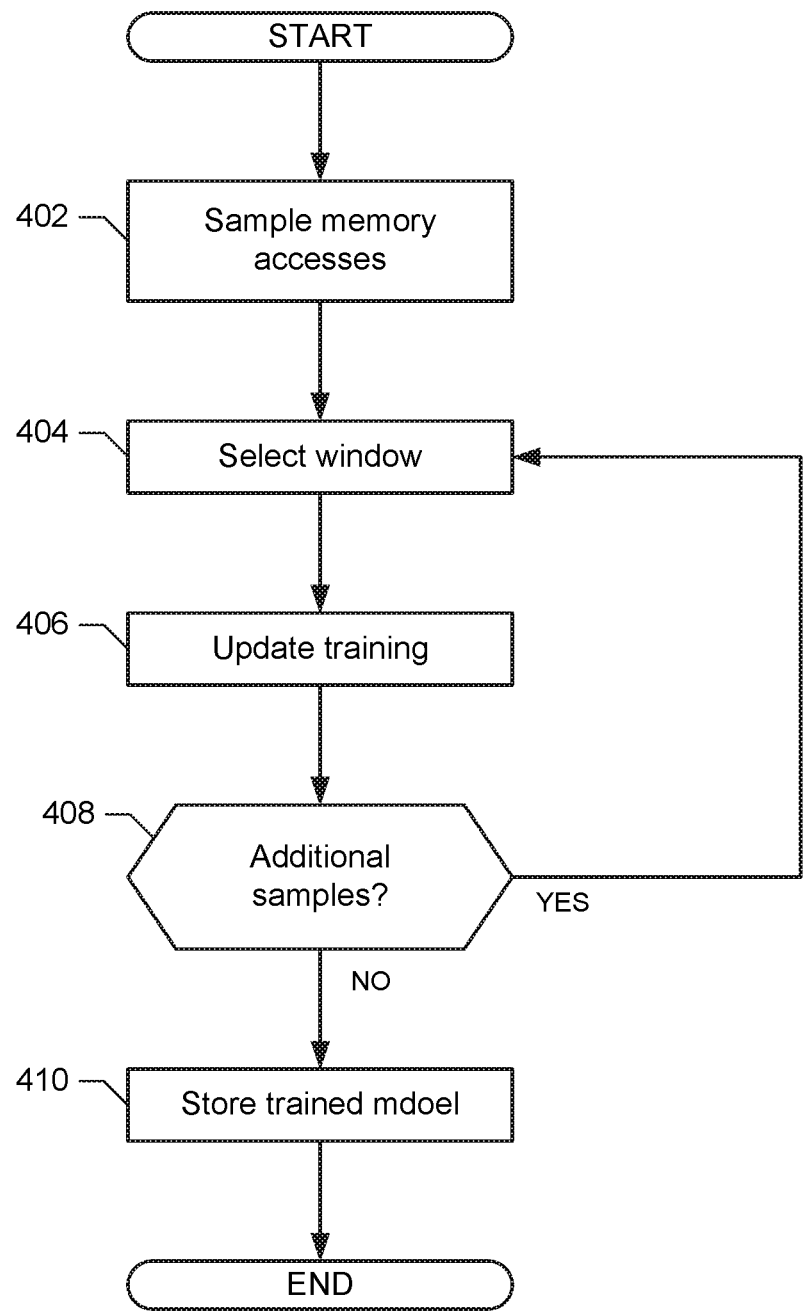
FIGS. 4-5 are flowcharts representative of machine readable instructions which may be executed to implement the leak detector of FIG. 1 and/or FIG. 2.
Figure 5:
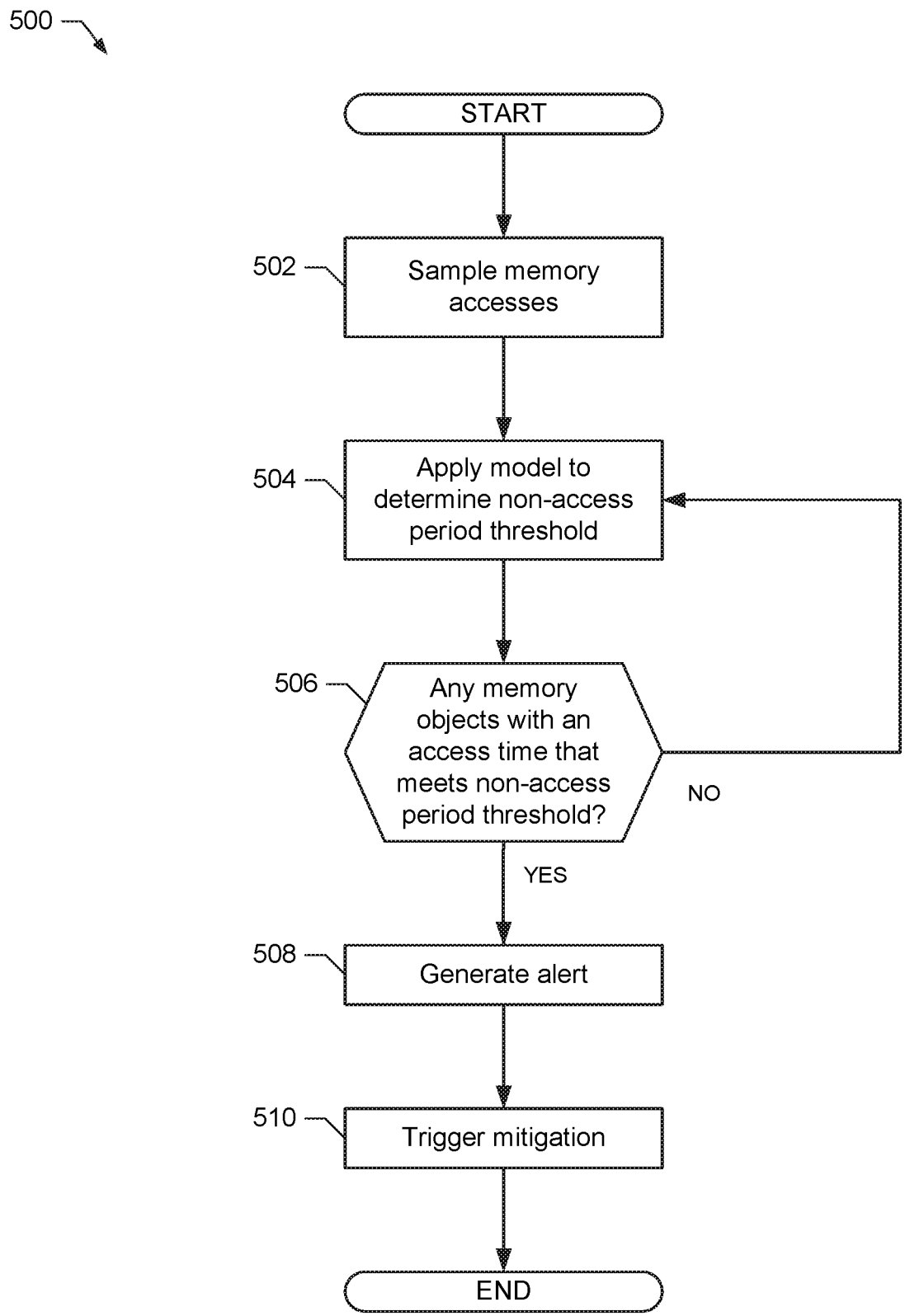

Flowcharts representative of example hardware logic, machine readable instructions, hardware implemented state machines, and/or any combination thereof for implementing the leak detector 130 of FIG. 1 and/or FIG. 2 are shown in FIGS. 4-5. The machine readable instructions may be an executable program or portion of an executable program for execution by a computer processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in FIGS. 4-5, many other methods of implementing the example apparatus 50 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 4-5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The program 400 of FIG. 4 may be executed to implement the leak detector 130 to perform training of a model. The program 400 begins when the example heap activity monitor 210 collects and stores samples of memory access information for the program of interest 102 in the example sample repository 220 (block 402).

The example window selector 230 selects a window of samples (e.g., n activity pairs) (block 404). The example non-access period generator 240 initiates/updates training of a model associated with execution of the program of interest 102 based on the selected window of samples (block 406). According to the illustrated example, the samples are a sequence of heap activities, $A=\{\alpha_1, \alpha_2, \ldots\}$ from which the window of samples are selected. The windowed sequence is fed to an RNN. The output of RNN for an input window ending at activity $\alpha_i$ will be the $NAP_{i+1}$ that can be obtained from next heap activity $\alpha_{i+1}$. The window selector 230 determines if there are further samples to be selected (e.g., the next slide of the window of size n) (block 408). When there are more samples, control returns to block 404 to select the next slide of the window for training.

When there are no more samples (block 408), the example non-access period generator 240 stores the resulting trained model in the example model repository 250 (block 410).

In an implementation in which training is performed at a central facility or other location remote from the end-user execution location, the trained model may then be distributed to the end-user location for use in analyzing execution of programs to detect potential memory leaks.

The program 400 then terminates.

The program 500 of FIG. 5 may be executed to implement the leak detector 130 to analyze execution of the program of interest 102 to detect potential memory leaks. The program 500 begins when the example heap activity monitor 210 collects and stores samples of memory access information for the program of interest 102 in the example sample repository 220 (block 502).

The example non-access period analyzer applies a model for the program of interest 102 retrieved from the example model repository 250 to the collected memory access information to determine a predicted NAP threshold (block 504).

For example, the non-access period analyzer 260 takes a sequence of heap activities as input and predicts a next NAP.

The example non-access period analyzer 260 then determines if any memory objects for the program of interest 102 have a last access time that meets a non-access period threshold based on the predicted NAP (block 506). For example, the non-access period threshold may be based on a user specified percentile setting that controls how much beyond the predicted NAP a NAP for an object will be allowed to extend before a potential memory leak is identified. For example, the threshold for an object i may be determined as:

$$(1+p)*NAP_i,$$

where p is a user specified percentile and $0 \le p < 1$. Thus, an expected next access time for an access of an object i that was last accessed at current timestamp is determined as:

$$\text{current\_timestamp}+(1+p)*NAP_i.$$

When an object is not accessed prior to the expected next time, the object is determined to be stale and, thus, associated with a potential memory leak. The value p may be adjusted by a user to control a level of false positives (e.g., according to the illustrated example, increasing p will increase the time during which a next access can occur to prevent flagging of a potential memory leak).

When an object's NAP does not meet the predicted NAP threshold (e.g., a next access time occurs before an expected next access time) (block 506), control returns to block 504 to continue analyzing an execution of the program of interest 102 for a potential memory leak).

When an object's NAP meets the predicted NAP threshold (e.g., a next access time does not occur before an expected next access time) (block 506), the leak alert generator 270 generates an alert of a potential memory leak (block 508) and the example leak mitigator 280 triggers mitigation of the potential memory leak (block 510).

Figure 6:
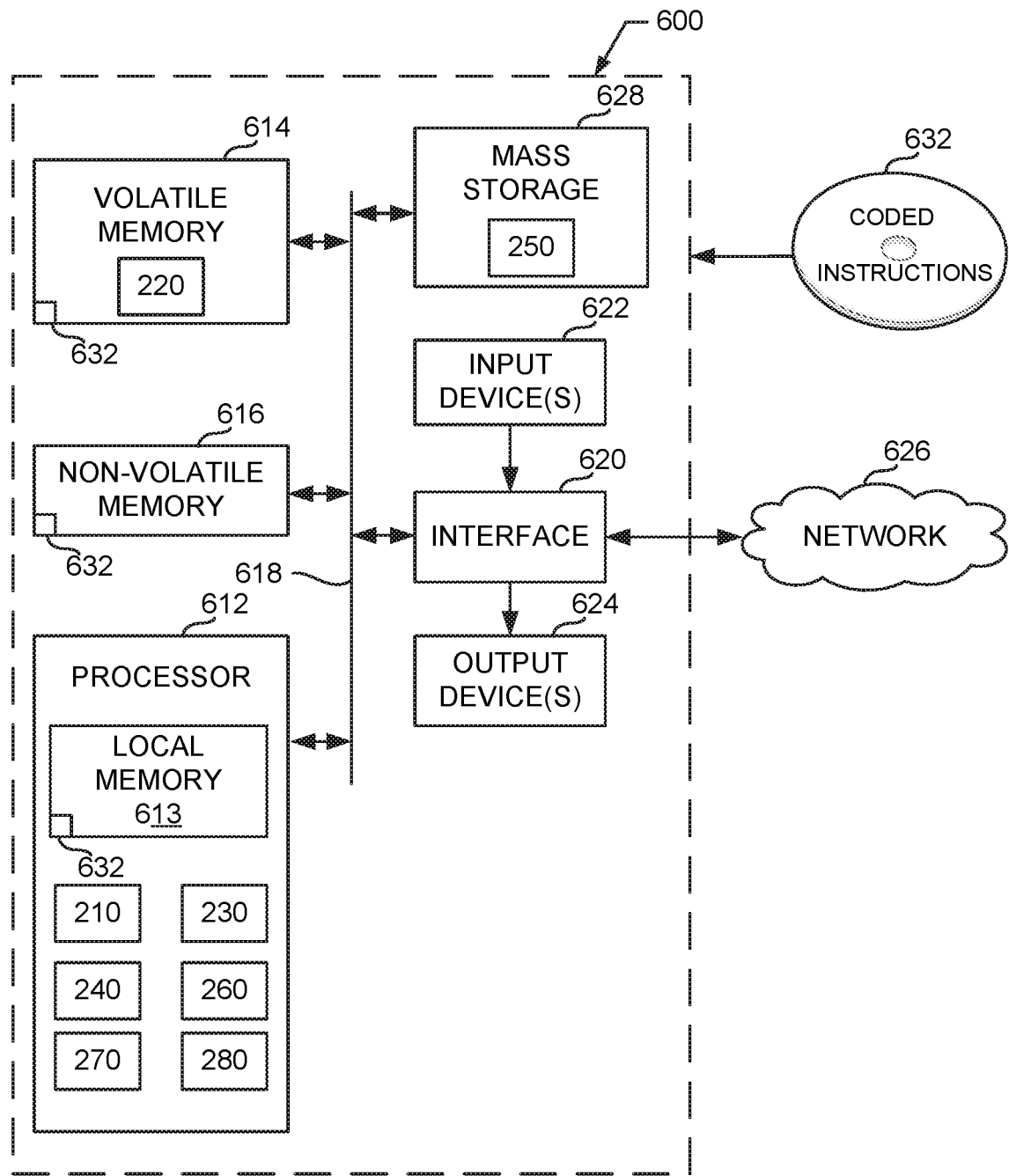
FIG. 6 is a block diagram of an example processing platform structured to execute the instructions of FIGS. 4-5 to implement the leak detector of FIG. 1 and/or FIG. 2.

FIG. 6 is a block diagram of an example processor platform 600 structured to execute the instructions of FIGS. 4-5 to implement the leak detector 130 of FIG. 1 and/or FIG. 2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example heap activity monitor 210, the example window selector 230, the example non-access period generator 240, the example non-access period analyzer 260, the example leak alert generator 270, and the example leak mitigator 280.

The processor 612 of the illustrated example includes a local memory 613 (e.g., a cache). The processor 612 of the illustrated example is in communication with a main memory including a volatile memory 614 and a non-volatile memory 616 via a bus 618. The example non-volatile memory 614 implements the example sample repository 220. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives. The example mass storage devices 628 implement the example model repository 250.

The machine executable instructions 632 of FIGS. 4-5 may be stored in the mass storage device 628, in the volatile memory 614, in the non-volatile memory 616, and/or on a removable non-transitory computer readable storage medium such as a CD or DVD.

From the foregoing, it will be appreciated that example methods, apparatus and articles of manufacture have been disclosed that detect memory leaks in execution of a program using unsupervised machine learning. The disclosed methods, apparatus and articles of manufacture improve the efficiency of using a computing device by reducing the number of false alarms of existing memory leak detectors because unsupervised machine learning is not reliant on being trained used specific examples of memory leaks. By detecting potential memory leaks and the particular objects/instructions within a program of interest, the some example implementations can identify potential memory reclamation points, which could be a valuable tool for building efficient software for memory-constraint edge devices. Furthermore, because the unsupervised machine learning does not rely on source code annotation or binary instrumentation, legacy software may be analyzed. The disclosed methods, apparatus and articles of manufacture are accordingly directed to one or more improvement(s) in the functioning of a computer.

Several examples are disclosed herein.

Example 1 includes a system comprising a memory accessed by a program of interest, a performance monitoring unit to collect first memory access information and second memory access information about an object accessed in the memory by the program of interest, and a leak detector to determine a non-access period based on the first memory access information and an unsupervised machine learning model trained based on the program of interest, and detect a potential memory leak of the program of interest based on the second memory access information and the non-access period.

Example 2 includes a system as defined in example 1, wherein the unsupervised machine learning model is a recurrent neural network.

Example 3 includes a system as defined in example 1, wherein, in response to detecting the potential memory leak, the leak detector is to remove the object from the memory.

Example 4 includes a system as defined in example 1, wherein, in response to detecting the potential memory leak, the leak detector is to generate an alert.

Example 5 includes a system as defined in example 1, wherein the non-access period is a predicted duration of time between consecutive accesses of the object.

Example 6 includes a system as defined in example 1, wherein the leak detector is to determine a threshold based on the non-access period.

Example 7 includes a system as defined in example 6, wherein the leak detector is to determine the threshold further based on a user setting.

Example 8 includes a system as defined in example 6, wherein the leak detector is to detect the potential memory leak when the second memory access information indicates that the object has not been accessed for a duration of time that meets the threshold.

Example 9 includes a system as defined in example 1, wherein the leak detector is to train the unsupervised machine learning model on a plurality of prior non-access periods.

Example 10 includes a non-transitory computer readable medium comprising instructions that, when executed, cause a machine to determine a non-access period between consecutive accesses, by a program of interest, of an object in a memory based on first memory access information, train an unsupervised machine learning model based on the non-access period, and detect a potential memory leak of the program of interest based on second memory access information and the unsupervised machine learning model.

Example 11 includes a non-transitory computer readable medium as defined in example 10, wherein the unsupervised machine learning model is a recurrent neural network.

Example 12 includes a non-transitory computer readable medium as defined in example 10, wherein the instructions, when executed, cause the machine to, in response to detecting the potential memory leak, remove the object from the memory.

Example 13 includes a non-transitory computer readable medium as defined in example 10, wherein the instructions, when executed, cause the machine to, in response to detecting the potential memory leak, generate an alert.

Example 14 includes a non-transitory computer readable medium as defined in example 10, wherein the non-access period is a duration of time between the consecutive accesses of the object.

Example 15 includes a non-transitory computer readable medium as defined in example 10, wherein the instructions, when executed, cause the machine to determine a threshold based on the second memory access information and the unsupervised machine learning model.

Example 16 includes a non-transitory computer readable medium as defined in example 15, wherein the instructions, when executed, cause the machine to determine the threshold further based on a user setting.

Example 17 includes a non-transitory computer readable medium as defined in example 15, wherein the instructions, when executed, cause the machine to detect the potential memory leak when the object has not been accessed for a duration of time that meets the threshold.

Example 18 includes a non-transitory computer readable medium as defined in example 10, wherein the instructions, when executed cause the machine to train the unsupervised machine learning model on a plurality of non-access periods including the non-access period.

Example 19 includes a method comprising determining a non-access period between consecutive accesses, by a program of interest, of an object in a memory based on first memory access information, training an unsupervised machine learning model based on the non-access period, and detecting a potential memory leak of the program of interest based on second memory access information and the unsupervised machine learning model.

Example 20 includes a method as defined in example 19, wherein the unsupervised machine learning model is a recurrent neural network.

Example 21 includes a method as defined in example 19, further including, in response to detecting the potential memory leak, removing the object from the memory.

Example 22 includes a method as defined in example 19, further including, in response to detecting the potential memory leak, generating an alert.

Example 23 includes a method as defined in example 19, wherein the non-access period is a duration of time between the consecutive accesses of the object.

Example 24 includes a method as defined in example 19, further including determining a threshold based on the second memory access information and the unsupervised machine learning model.

Example 25 includes a method as defined in example 24, further including determining the threshold further based on a user setting.

Example 26 includes a method as defined in example 24, further including detecting the potential memory leak when the object has not been accessed for a duration of time that meets the threshold.

Example 27 includes a method as defined in example 19, further including training the unsupervised machine learning model on a plurality of non-access periods including the non-access period.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A system comprising:
    a memory accessed by a program of interest;
    a performance monitoring unit to collect first memory access information and second memory access information about an object accessed in the memory by the program of interest; and
    a leak detector to:
        determine a non-access period based on the first memory access information and an unsupervised machine learning model trained based on the program of interest; and
        detect a potential memory leak of the program of interest based on the second memory access information and the non-access period.

2. A system as defined in claim 1, wherein the unsupervised machine learning model is a recurrent neural network.

3. A system as defined in claim 1, wherein, in response to detecting the potential memory leak, the leak detector is to remove the object from the memory.

4. A system as defined in claim 1, wherein, in response to detecting the potential memory leak, the leak detector is to generate an alert.

5. A system as defined in claim 1, wherein the non-access period is a predicted duration of time between consecutive accesses of the object.

6. A system as defined in claim 1, wherein the leak detector is to determine a threshold based on the non-access period.

7. A system as defined in claim 6, wherein the leak detector is to determine the threshold further based on a user setting.

8. A system as defined in claim 6, wherein the leak detector is to detect the potential memory leak when the second memory access information indicates that the object has not been accessed for a duration of time that meets the threshold.

9. A system as defined in claim 1, wherein the leak detector is to train the unsupervised machine learning model on a plurality of prior non-access periods.

10. A non-transitory computer readable medium comprising instructions that, when executed, cause a machine to:
    determine a non-access period between consecutive accesses, by a program of interest, of an object in a memory based on first memory access information;
    train an unsupervised machine learning model based on the non-access period; and
    detect a potential memory leak of the program of interest based on second memory access information and the unsupervised machine learning model.

11. A non-transitory computer readable medium as defined in claim 10, wherein the unsupervised machine learning model is a recurrent neural network.

12. A non-transitory computer readable medium as defined in claim 10, wherein the instructions, when executed, cause the machine to, in response to detecting the potential memory leak, remove the object from the memory.

13. A non-transitory computer readable medium as defined in claim 10, wherein the instructions, when executed, cause the machine to, in response to detecting the potential memory leak, generate an alert.

14. A non-transitory computer readable medium as defined in claim 10, wherein the non-access period is a duration of time between the consecutive accesses of the object.

15. A non-transitory computer readable medium as defined in claim 10, wherein the instructions, when executed, cause the machine to determine a threshold based on the second memory access information and the unsupervised machine learning model.

16. A non-transitory computer readable medium as defined in claim 15, wherein the instructions, when executed, cause the machine to determine the threshold further based on a user setting.

17. A non-transitory computer readable medium as defined in claim 15, wherein the instructions, when executed, cause the machine to detect the potential memory leak when the object has not been accessed for a duration of time that meets the threshold.

18. A non-transitory computer readable medium as defined in claim 10, wherein the instructions, when executed cause the machine to train the unsupervised machine learning model on a plurality of non-access periods including the non-access period.

19. A method comprising:
   determining a non-access period between consecutive accesses, by a program of interest, of an object in a memory based on first memory access information;
   training an unsupervised machine learning model based on the non-access period; and
   detecting a potential memory leak of the program of interest based on second memory access information and the unsupervised machine learning model.

20. A method as defined in claim 19, wherein the unsupervised machine learning model is a recurrent neural network.

21. A method as defined in claim 19, further including, in response to detecting the potential memory leak, removing the object from the memory.

22. A method as defined in claim 19, further including, in response to detecting the potential memory leak, generating an alert.

23. A method as defined in claim 19, wherein the non-access period is a duration of time between the consecutive accesses of the object.

24. A method as defined in claim 19, further including determining a threshold based on the second memory access information and the unsupervised machine learning model.

25. A method as defined in claim 24, further including determining the threshold further based on a user setting.

* * * * *